United States Patent Office 3,655,595
Patented Apr. 11, 1972

3,655,595
EPOXY BINDER FOR MAGNETIC COATING COMPOSITION
Louis M. Higashi, Monte Sereno, Calif., assignor to Memorex Corporation, Santa Clara, Calif.
No Drawing. Filed Feb. 20, 1969, Ser. No. 801,193
Int. Cl. C08g 30/16
U.S. Cl. 260—18 EP 5 Claims

ABSTRACT OF THE DISCLOSURE

A fluid, thermosetting magnetic coating composition comprising magnetic particles and a film-forming composition or binder stable at room temperatures. The binder or film-forming composition comprises an adduct based upon dimer acid and the diglycidyl ether of bisphenol A with terminal oxirane rings, and having a molecular weight of from about 800 to about 5000 and an epoxide equivalent weight of from about 400 to about 2600 and adapted to form a flexible film upon hardening, a fatty acid polyamide, and a curing agent comprising an amine and a Lewis acid-alkyl amine complex salt.

BACKGROUND OF THE INVENTION

Magnetic coatings are applied to various substrates either flexible elements such as tapes or films, or rigid elements such as metal, e.g. aluminum or plastic discs, cards or other shapes. As is known, such coatings comprise magnetically susceptible particles embedded or suspended in a binder. The coatings must be smooth surfaced to permit magnetic reading heads to reproduce good signals from the coating. In the usual production of the magnetically coated surface, the coating is applied and cured or hardened thoroughly and is thereafter mechanically treated to bring it to the desired smoothness. The flowout of the heretofore known binders in the application of such coating to the substrate has been such as to result in a rough, finally hardened surface. This has necessitated the surface finishing mentioned above to improve smoothness and magnetic performance, particularly signal-to-noise ratios.

In addition to surface smoothness, many characteristics are necessary for a magnetic coating composition for magnetic memories. Specific characteristics of this type are: the ability of the binder to provide good dispersions of magnetic pigment, the ability of the binder to bond to substrates on which a magnetic layer is to be formed, and the ability of the binder to prevent shedding of magnetic particles and wear on magnetic heads used for recording signals on the magnetic memory.

The present invention provides a coating composition of the type described which exhibits good dispersion of the magnetic particles with resultant high signal-to-noise ratios. The coating of this invention has very desirable properties in providing adherence of the coating to substrates and preventing magnetic oxide shedding and magnetic head wear. An important advantage of the binder and coating of the present invention, however, is that it exhibits an advantageous flow-out to provide a heat-cured magnetic coating of an initial or as-coated smoothness substantially equivalent to the smoothness of the prior art coatings after the latter have been surface finished. At the same time, a further advantage is that the curing of the binder of the present invention is accelerated by incorporation of a curing agent, to provide a commercially satisfactory hardening time, on tape or any other desired substrate while at the same time retaining a satisfactory pot-life before cure.

SUMMARY OF INVENTION

This invention concerns an improved, fluid, thermosetting binder for a flexible magnetic coating, comprising an epoxide resin which is an adduct based upon dimer acid and the diglycidyl ether of bisphenol A with terminal oxirane rings having a molecular weight of from about 800 to about 5000 and an epoxide equivalent weight of from about 400 to about 2600 and adapted to form a flexible film upon hardening or curing; a polyamide which is a condensation product of a polyamine and a fatty acid and which has an amine value of at least 300; and an admixture of a Lewis-acid-alkyl amine complex salt and a primary amine such as the amines in the group N-aminoethylpiperazine, ethylenediamine and diethylenetriamine. The invention also relates to the improved magnetic coating and the improved magnetically coated article obtained therewith.

The epoxide resin useful herein is a condensation product of the type stated and it advantageously has a molecular weight of about 1400 and an epoxide equivalent weight of about 700, the resin being particularly adapted to form a flexible coating film. The resin found to be especially useful herein is a product sold by Shell Chemical Company under the trademark Epon 872 which has an epoxide equivalent of approximately 700.

The polyamide co-reactant useful herein is suitably a condensation product of an aliphatic polyamine and a dibasic fatty acid and has a general structure as follows:

$$HO—(OC—R—CONHR'—NH—)_n—H$$

where R represents the aliphatic chain of a fatty acid; R′ an aliphatic carbon chain of at least two carbon atoms; and *n* is from 1.0 to 8.0, but preferably 2.0. A polyamide found to be very effective in the present invention has an amine value of approximately 377. A polyamide found to give excellent results in this invention is sold by General Mills Chemicals Corp. under the trademark Versamid 140, and has an amine value of approximately 377. Polyamides having amine values of over 300 are also useful herein instead of the Versamid 140; and some such amides are those sold under the trademarks Versamid 125 of amine value 306, and Versamid X280 of amine value 316, both sold by General Mills Chemicals. Alternatively, there can be used polyamides sold by Union Carbide under the trademark Plastics ZZLA–0315 of amine value 315, ZZLA–0325 of amine value 325, and ZZLA–0340 of amine value 340. Suitably, the polyamide is present in the binder in such amount that the ratio of polyamide to reactive oxirane or epoxy group of the resin described above is substantially stoichiometric but it can vary from about 0.8:1 to about 2:1. There is a rather sharp decline in the tensile strength of the final film above about 2:1, but the Sward hardness is satisfactory. However, all properties tested for are improved when the ratio is from about 0.8:1 to about 1.3:1.

The Lewis acid-alkyl amine complex salt in admixture with a primary amine acts to catalyze or accelerate reaction between the aforesaid epoxy resin, and the polyamide which takes place upon heat curing. It is believed that the Lewis acid complex salt of the alkyl amine acts as a catalyst and that its effect is modified by the presence of the primary amine which is, for example, N-aminoethylpiperazine, ethylenediamine, or diethylenetriamine. Lewis acids which form the complex salt useful herein are, for example, boron trifluoride, zinc chloride, and stannic chloride. Advantageously, there is employed as the complex salt boron trifluoride-ethylamine. Suitably, the catalyst admixture contains such salt and such amine in a ratio in parts by weight of from about 0.25:1 to about 4.0:1. When the $BF_3$-ethylamine salt is used, a ratio of about 1:1 gives optimum results in pot life and in flexibility of the final cured film. The total catalyst admixture is present in an amount of from 0.1% to 2.0% by weight based on the total binder composition.

The magnetic coatings of the present invention comprise magnetically susceptible particles dispersed in the binder described herein. The magnetically susceptible particles can be of any desired or known type, such as magnetic iron oxide or chromium dioxide. However, the magnetic particles used in the examples below were a gamma ferric oxide pigment having the following magnetic properties when measured on a 60 cycle hysteresis loop tracer, using a symmetrical cyclic magnetic field at 1000 oersteds.

| Magnetic property: | Value |
|---|---|
| Residual saturation (Br), gauss | 1750–1900 |
| Maximum saturation (Bm), gauss | 3300–3500 |
| Coercive force (Hc), oersteds | 285–305 |

In preparing the magnetic coatings the pigment and a solvent, preferably with addition of a dispersing agent such as lecithin, are suitably milled or otherwise intimately admixed, the polyamide added and thoroughly mixed with the first dispersion until the whole is free of agglomerates. Thereafter, the mill base so prepared is mixed with a solvent and with the catalyst admixture and the whole subjected to high shear mixing or blending, with adjustment to the desired viscosity and is then applied to a substrate, such as a Mylar film or other flexible material, or to a rigid material, e.g. a disc or other shape of a metal such as aluminum, or of plastic. The substrate is, of course, nonmagnetic. The coating is then cured, preferably at from 135° C. to 150° C. for less than one hour, suitably for about three minutes. The liquid coating composition can be applied by any desired method to the substrate, e.g. by roll coating, knife coating, or spray coating. The final coating as thus produced is equivalent in smoothness to commercial tapes, for instance, which have been subjected to surface finishing processes. The magnetic recording member so produced exhibits very low peak-to-valley roughness and has a high signal-to-noise ratio.

DETAILED DESCRIPTION OF INVENTION

The advantages of the invention and the superiority of magnetic coatings produced thereby are demonstrated by the following specific examples and by Table I below which lists the peak-to-valley roughness as measured with a Bendix Linear Proficorder of the as-coated tape surfaces produced by the practice of this invention and comparative measurement data for typical commercial products made by the general procedure disclosed in U.S. Pat. No. 3,144,352 measured both as coated and after surface treatment.

TABLE I

| Tape | Surface treatment | Roughness in microinches |
|---|---|---|
| Commercial tape: | | |
| #1 | None | 27.5 |
| #2 | do | 27.5 |
| #1 | Yes | 13.0 |
| #2 | Yes | 7.3 |
| Formulation: | | |
| A | None | 8.6 |
| B | do | 13.0 |
| C | do | 2.5 |
| D | do | 9.5 |
| E | do | 9.6 |

The Formulations designated as A, B, C, D, and E are made according to this invention as described in the examples below.

A comparison of the noise level of an as-coated tape using Formulation A was made with that of the Commercial Tape #2 but wherein the latter had been subject to surface finishing. The properties of the Formulation A tape compared favorably with those of the Commercial Tape in these tests, as shown in Table II:

TABLE II

| Measurement | Decibels | |
|---|---|---|
| | Type #2 | Formulation A |
| Signal/bias noise | 96.5 | 101.3 |
| Saturation noise | 57.0 | 57.0 |
| DC noise | 66.3 | 66.3 |
| Bulk noise | 77.0 | 80.7 |

The following examples will show some modes of carrying out the present invention.

EXAMPLE I

| Formulation A, components | Parts by weight | |
|---|---|---|
| | Amounts | Solids |
| Magnetic pigment | 73.2 | 73.8 |
| Soya lecithin | 2.2 | 2.2 |
| Versamid 140 | 5.8 | 5.2 |
| Epon 872, 85% solution in Cellosolve | 21.2 | 18.0 |
| $BF_3$-ethylamine, 10% solution in sec-butanol | 3.0 | 0.3 |
| N-aminoethylpiperazine | 0.5 | 0.5 |
| 80/20 pentanol-1/sec-butanol solvent | 68.2 | |
| Totals | 174.1 | 100.0 |

The magnetic pigment, lecithin and 80/20 solvent were mixed together and milled in a ball mill for approximately one hour. Then the Versamid was added and milling continued for approximately eighteen more hours until the slurry was free of agglomerates. This mill base was then let down with a solution of Epon 872, the $BF_3$-ethylamine complex solution and the N-aminoethylpiperazine and then subjected to thorough high shear mixing and blending. The viscosity was adjusted to approximately 5000 cps. at 25° C. as measured by a Brookfield viscometer using a #4 spindle at a speed of 20 r.p.m. The coating was then applied to a Mylar film and cured at 135° C. to 150° C. for about three minutes. The cured coating was found to be non-blocking at 150° C. The heat cured as-coated peak-to-valley surface roughness as measured with a Bendix Linear Proficorder was found to be approximately 8.6 microinches.

EXAMPLE II

| Formulation A, components | Parts by weight | |
|---|---|---|
| | Amounts | Solids |
| Magnetic pigment | 69.5 | 69.5 |
| Nuodex Nuosperse 657 | 1.4 | 1.4 |
| Versamid 140 | 6.9 | 6.9 |
| Epon 872, 85% solution in Cellosolve | 25.1 | 21.3 |
| $BF_3$-ethylene, 10% solution in sec-butanol | 3.0 | 0.3 |
| N-aminoethylpiperazine | 0.6 | 0.6 |
| 80/20 methyl Cellosolve/secbutanol solvent | 70.6 | |
| Totals | 177.1 | 100.0 |

EXAMPLE III

| Formulation A, components | Parts by weight | |
|---|---|---|
| | Amounts | Solids |
| Magnetic pigment | 49.7 | 49.7 |
| Soya lecithin | 1.0 | 1.0 |
| Versamid 140 | 11.7 | 11.7 |
| Epon 872, 85% solution Cellosolve | 42.5 | 36.1 |
| $BF_3$-ethylamine, 10% solution in sec-butanol | 5.0 | 0.5 |
| N-aminoethylpiperazine | 1.0 | 1.0 |
| 80/20 methyl Cellosolve/sec-butanol solvent | 49.7 | |
| Totals | 160.6 | 100.0 |

EXAMPLE IV

| Formulation A, components | Parts by weight | |
|---|---|---|
| | Amounts | Solids |
| Magnetic pigment | 70.0 | 70.0 |
| Soya lecithin | 1.4 | 1.4 |
| Versamid 140 | 4.3 | 4.3 |
| 60% solution Epon 1001 in Cellosolve | 20 0 | 12.0 |
| 75% solution Epon 872 in xylene | 16.0 | 12.0 |
| Diethylenetriamine | 0.3 | 0.3 |
| 80/20 methyl Cellosolve/sec-butanol solvent | 52.9 | |
| Totals | 164.9 | 100.0 |

EXAMPLE V

| Formulation A, components | Parts by weight | |
|---|---|---|
| | Amounts | Solids |
| Magnetic pigment | 70.0 | 70.0 |
| Soya lecithin | 1.4 | 1.4 |
| Versamid 140 | 4.1 | 4.1 |
| Epon 1001, 60% solution in Cellosolve | 12.2 | 7.3 |
| Epon 872, 70% solution in xylene | 22.7 | 17.0 |
| Diethylene triamine | 0.2 | 0.2 |
| 80/20 methyl Cellosolve/sec-butanol solvent | 52.9 | |
| Totals | 163.5 | 100.0 |

In the specification and claims, all parts and percentages are by weight unless otherwise indicated. Epoxide equivalent is defined as the grams of epoxy resin containing one gram equivalent of epoxide. Amine value is defined as the milligrams of potassium hydroxide equivalent to the amine alkalinity present in one gram of material. Cellosolve is a trademark for 2-ethoxy-ethanol; and methyl Cellosolve, for 2-methoxy-ethanol.

What is claimed is:

1. In a magnetic coating composition comprising a binder and magnetically susceptible particles uniformly dispersed therethrough, a binder composition to improve as-coated smoothness, an admixture of:

(A) an epoxy resin having reactive oxirane groups, a molecular weight of from about 800 to about 5000 and an epoxide equivalent weight of from about 400 to about 2600, and adapted to form a flexible film upon curing;

(B) an aliphatic fatty acid polyamide having an amine value of at least 300;

(C) an admixture of a primary amine selected from the class consisting of N-aminoethylpiperazine, ethylenediamine and diethylenetriamine and a complex salt of a Lewis acid selected from the class consisting of boron trifluoride, zinc chloride and stannic chloride and said primary amine;

(D) said polyamide being present in such amount that the ratio of amine groups therein to reactive oxirane groups in said resin is from about 0.8:1 to 2:1.

2. Composition as in claim 1, wherein said epoxy resin has a molecular weight of about 1400 and an epoxide equivalent weight of about 700.

3. Composition as in claim 2, wherein said polyamide is a polyamide of dibasic fatty acid and has an amine value of about 377.

4. Composition as in claim 3 wherein said ratio of amine to oxirane groups is from about 0.8 to about 1.3 to 1.

5. Composition as in claim 1 wherein said complex salt is boron trifluoride-ethylamine.

References Cited

UNITED STATES PATENTS

| | | | |
|---|---|---|---|
| 2,909,494 | 12/1958 | Parry et al. | 260—18 |
| 3,057,809 | 12/1962 | Newey | 260—18 |
| 3,148,082 | 9/1964 | Di Ricco et al. | 260—18 |

OTHER REFERENCES

"Versamide" Technical Bulletin 11–E–1 (1961), pp. 11–13, General Mills Chem. Div.

Synopsis of "Versamide" Seminar (1958), pp. 1–2, General Mills Chem. Div.

Shell Technical Bulletin SC 62–131, p. 4 (1962).

DONALD E. CZAJA, Primary Examiner

E. C. RZUCIDLO, Assistant Examiner

U.S. Cl. X.R.

117—132; 260—18 PN; 830 P